(12) United States Patent
Fallon et al.

(10) Patent No.: US 8,713,559 B2
(45) Date of Patent: Apr. 29, 2014

(54) SYSTEM AND METHOD FOR UPDATING FIRMWARE

(75) Inventors: Raymond M. Fallon, Oranmore (IE); Jane E. Morgan, Glasnevin (IE); Daniel C. Cohen, Newtonville, MA (US)

(73) Assignee: Schneider Electric IT Corporation, North Billerica, MA (US)

( * ) Notice: Subject to any disclaimer, the term of this patent is extended or adjusted under 35 U.S.C. 154(b) by 550 days.

(21) Appl. No.: 12/946,400

(22) Filed: Nov. 15, 2010

(65) Prior Publication Data

US 2012/0124568 A1    May 17, 2012

(51) Int. Cl.
*G06F 9/44* (2006.01)

(52) U.S. Cl.
USPC ........... 717/172; 717/170; 717/171; 717/173; 717/168

(58) Field of Classification Search
None
See application file for complete search history.

(56) References Cited

U.S. PATENT DOCUMENTS

| | | |
|---|---|---|
| 5,717,934 A | 2/1998 | Pitt et al. |
| 5,860,012 A | 1/1999 | Luu |
| 5,960,204 A | 9/1999 | Yinger et al. |
| 6,167,567 A | 12/2000 | Chiles et al. |
| 6,199,204 B1 | 3/2001 | Donohue |
| 6,282,709 B1 | 8/2001 | Reha et al. |
| 6,282,711 B1 | 8/2001 | Halpern et al. |
| 6,457,076 B1 | 9/2002 | Cheng et al. |
| 6,493,871 B1 | 12/2002 | McGuire et al. |
| 6,795,965 B1 | 9/2004 | Yadav |
| 7,003,767 B2 | 2/2006 | Larkin |
| 7,089,548 B2 | 8/2006 | Lin |
| 7,093,246 B2 | 8/2006 | Brown et al. |
| 7,275,169 B2 | 9/2007 | Aharonian et al. |
| 7,402,062 B2 | 7/2008 | Perry |
| 7,509,529 B2 | 3/2009 | Colucci et al. |
| 7,703,046 B2 | 4/2010 | Fallon et al. |
| 7,913,246 B2 * | 3/2011 | Hammond et al. ........... 717/173 |
| 2005/0144616 A1 | 6/2005 | Hammond et al. |
| 2006/0107071 A1 * | 5/2006 | Girish et al. ................. 713/191 |

(Continued)

FOREIGN PATENT DOCUMENTS

| | | |
|---|---|---|
| EP | 0 895 157 A1 | 2/1999 |
| EP | 0 950 948 A2 | 10/1999 |

(Continued)

OTHER PUBLICATIONS

International Search Report for PCT/US2011/060545 mailed Mar. 5, 2012.

*Primary Examiner* — Lewis A Bullock, Jr.
*Assistant Examiner* — Mark Gooray
(74) *Attorney, Agent, or Firm* — Lando & Anastasi, LLP

(57) ABSTRACT

A system and method for guiding a user through a procedure for updating firmware on an uninterruptible power supply. In one example, the system includes a computer system and a communication link to connect the computer system to the uninterruptible power supply. The computer system includes a discovery component, which is configured to detect a version of the firmware installed on the uninterruptible power supply and to detect a model type of the uninterruptible power supply. The computer system also includes a firmware update component, a preparation sequence and an instruction component corresponding to the model type of the uninterruptible power supply and the version of the firmware installed on the uninterruptible power supply. The preparation sequence is configured to prepare the uninterruptible power supply for the firmware update component. The instruction component is configured to display instructions that guide the user through the procedure for updating the firmware.

18 Claims, 11 Drawing Sheets

(56) References Cited

U.S. PATENT DOCUMENTS

| | | |
|---|---|---|
| 2009/0013251 A1* | 1/2009 | Kim .............................. 715/705 |
| 2010/0244567 A1 | 9/2010 | Brookshire et al. |
| 2010/0250160 A1 | 9/2010 | Spitaels et al. |

FOREIGN PATENT DOCUMENTS

| | | |
|---|---|---|
| GB | 2 348 987 A | 10/2000 |
| WO | 2005045671 A1 | 5/2005 |
| WO | 2008026139 A2 | 3/2008 |

\* cited by examiner

SYSTEM AND METHOD FOR UPDATING FIRMWARE

FIELD OF THE INVENTION

The present invention relates to systems and methods for providing uninterruptible power, and more particularly, to methods and systems used to upgrading firmware on a power device, such as an uninterruptible power supply (UPS).

BACKGROUND

The use of uninterruptible power supplies (UPS) to provide regulated, uninterrupted power for sensitive and/or critical loads, such as computer systems and other data processing systems, is known.

Firmware is a term used for computer programs that internally control various electronic devices. Such electronic devices use firmware to enable the device's basic operation. A manufacturer of the device may wish to update the firmware version installed on the device to improve or add functionality to the device, or alternatively to correct any errors discovered during use.

A conventional UPS firmware update usually requires specific user interaction and distinct operational sequence to be followed by the operator to successfully update a unit. Before performing the operation sequence the user will also perform a series of steps to set the UPS in the proper state to accept the firmware. A typical firmware update process involves a transfer of the firmware files, installing the firmware on the UPS and validating that the update is completed successfully. This process is typically very manual, error-prone and intimidating to unskilled users. Different procedures are required for different models of UPS devices. Mistakes made by a user can render the UPS in a state that requires it be returned to the manufacturer.

SUMMARY

One aspect of the present disclosure is directed to a system for guiding a user through a procedure for updating a firmware program on an uninterruptible power supply. In one embodiment, the system comprises a computer system, and a communication link to connect the computer system to the uninterruptible power supply. The computer system includes a discovery component, configured to detect a version of the firmware program installed on the uninterruptible power supply and to detect a model type of the uninterruptible power supply. The computer system further comprises a firmware update component corresponding to the model type of the uninterruptible power supply and the version of the firmware program installed on the uninterruptible power supply. The computer system further comprises a preparation sequence corresponding to the model type of the uninterruptible power supply and the version of the firmware program installed on the uninterruptible power supply. The preparation sequence is configured to prepare the uninterruptible power supply for the firmware update component. The computer system further comprises an instruction component configured to display instructions on the computer system corresponding to the preparation sequence and the firmware update component. The instructions provide guidance to guide the user through the procedure corresponding to for updating the firmware program.

Embodiments of the system further include the communication link that is configured to transmit a new version of the firmware program and the firmware update component is configured to install a new version of the firmware program on the uninterruptible power supply based on the version of the firmware program installed on the uninterruptible power supply and the model type of the uninterruptible power supply. In certain embodiments, the discovery component is configured to detect configuration management information about equipment connected to the uninterruptible power supply and the instruction component further comprises instructions that describe effects of the firmware update procedure on the equipment connected to the uninterruptible power supply.

In another embodiment, the firmware update component comprises one or more firmware update programs corresponding to one or more model types of uninterruptible power supplies, one or more versions of the firmware update program and one or more firmware update programs corresponding to one or more components of the uninterruptible power supply. In certain embodiments, the firmware update component communication link is configured to transmit in response to communication from the uninterruptible power supply only the firmware programs corresponding to the version of the firmware program installed on the uninterruptible power supply, the one or more components of the uninterruptible power supply and the model type of the uninterruptible power supply.

In another embodiment, the instruction component of the computer system is configured to display on the computer system a further comprises a visual representation of components of the uninterruptible power supply and the instruction component further comprises is configured to display on the computer system one or more instructional screens configured to guide the user through the procedure corresponding to updating the firmware program.

In another embodiment, the discovery component of the computer system is configured to determine revisions versions of the firmware program currently installed on the components of the uninterruptible power supply, and wherein the instruction component is configured to display one or more of firmware program versions previously selected to be installed on the uninterruptible power supply. In another embodiment, the computer system further comprises a plurality of connection ports, and the computer system is configured to automatically determine which of the plurality of connection ports is connected to the uninterruptible power supply.

In another embodiment, the preparation sequence further comprises a communication component configured to control at least one function of the uninterruptible power supply. The instruction component is configured to obtain permission from the user to control the at least one function of the uninterruptible power supply. In another embodiment, the preparation sequence further comprises a monitoring component configured to measure system information associated with the uninterruptible power supply and the instruction component is configured to communicate instructions corresponding to the system information measured by the monitoring component.

In another embodiment, the monitoring component is configured to determine whether the user performed a step of the displayed instructions and the instruction component is configured to prevent the user from proceeding in the firmware update procedure if the step of the displayed instructions was not performed.

Another aspect of the present disclosure is directed to a method of guiding a user through a procedure for updating a firmware program on an uninterruptible power supply. In one embodiment, the method comprises establishing a connection between the uninterruptible power supply and a computer system, detecting a model of the uninterruptible power supply connected to the computer system, determining a version of the firmware program installed on the uninterruptible power supply, initiating a preparation procedure corresponding to the model of the uninterruptible power supply and the version of the firmware program currently installed on the uninterruptible power supply, initiating a firmware update procedure corresponding to the model of the uninterruptible power supply and the version of the firmware program currently installed on the uninterruptible power supply, and displaying instructions on the computer system corresponding to the preparation procedure and the firmware update procedure, to guide the user through the procedure corresponding to updating the version of the firmware program.

Embodiments of the method may further include initiating a firmware update procedure further comprising transmitting a new version of the firmware program to the uninterruptible power supply from the computer system and installing the new version of the firmware program on the uninterruptible power supply corresponding to the version of the firmware program installed on the uninterruptible power supply and the model type of the uninterruptible power supply. In another embodiment, initiating a preparation procedure further comprises controlling at least one function of the uninterruptible power supply, and displaying instructions further comprises obtaining permission from the user to control the at least function of the uninterruptible power supply.

In yet another embodiment, displaying instructions further comprises displaying one or more instructional screens corresponding to updating the firmware program, and wherein the one or more instructional screens further comprise a visual representation of components of the uninterruptible power supply. In another embodiment, initiating a preparation procedure further comprises determining whether equipment is connected to the uninterruptible power supply, determining effects of the firmware update procedure on the equipment connected to the uninterruptible power supply, and alerting the user to the effects of the of the firmware update procedure on the connected equipment. In another embodiment, initiating the firmware update procedure further comprises updating a boot loader firmware program.

Embodiments of the method may further include detecting an error during the firmware update procedure, displaying an error screen in response to detecting an error, and reverting to a previous version of the firmware program in response to detecting an error. In another embodiment, the method further comprises measuring system information associated with the uninterruptible power supply, communicating instructions based on the system information measured, determining whether the user performed the instructions, and preventing the user from proceeding in the firmware update procedure if the instructions were not performed.

Another aspect of the present disclosure is directed to computer readable medium having stored thereon sequences of instructions for updating a firmware program on an uninterruptible power supply. The instructions include those that will cause a processor to establish a connection between the uninterruptible power supply and a computer system, detect a model of the uninterruptible power supply connected to the computer system, determine a version of the firmware program installed on the uninterruptible power supply, initiate a preparation procedure corresponding to the model of the uninterruptible power supply and the version of the firmware program currently installed on the uninterruptible power supply, initiate a firmware update procedure corresponding to the model of the uninterruptible power supply and the version of the firmware program currently installed on the uninterruptible power supply, and display instructions on the computer system corresponding to the firmware update component, to guide the user through the procedure corresponding to updating the version of the firmware program.

Further features and advantages of the present invention as well as the structure and operation of various embodiments of the present invention are described in detail below with reference to the accompanying drawings. In the drawings, like reference numerals indicate like or functionally similar elements.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
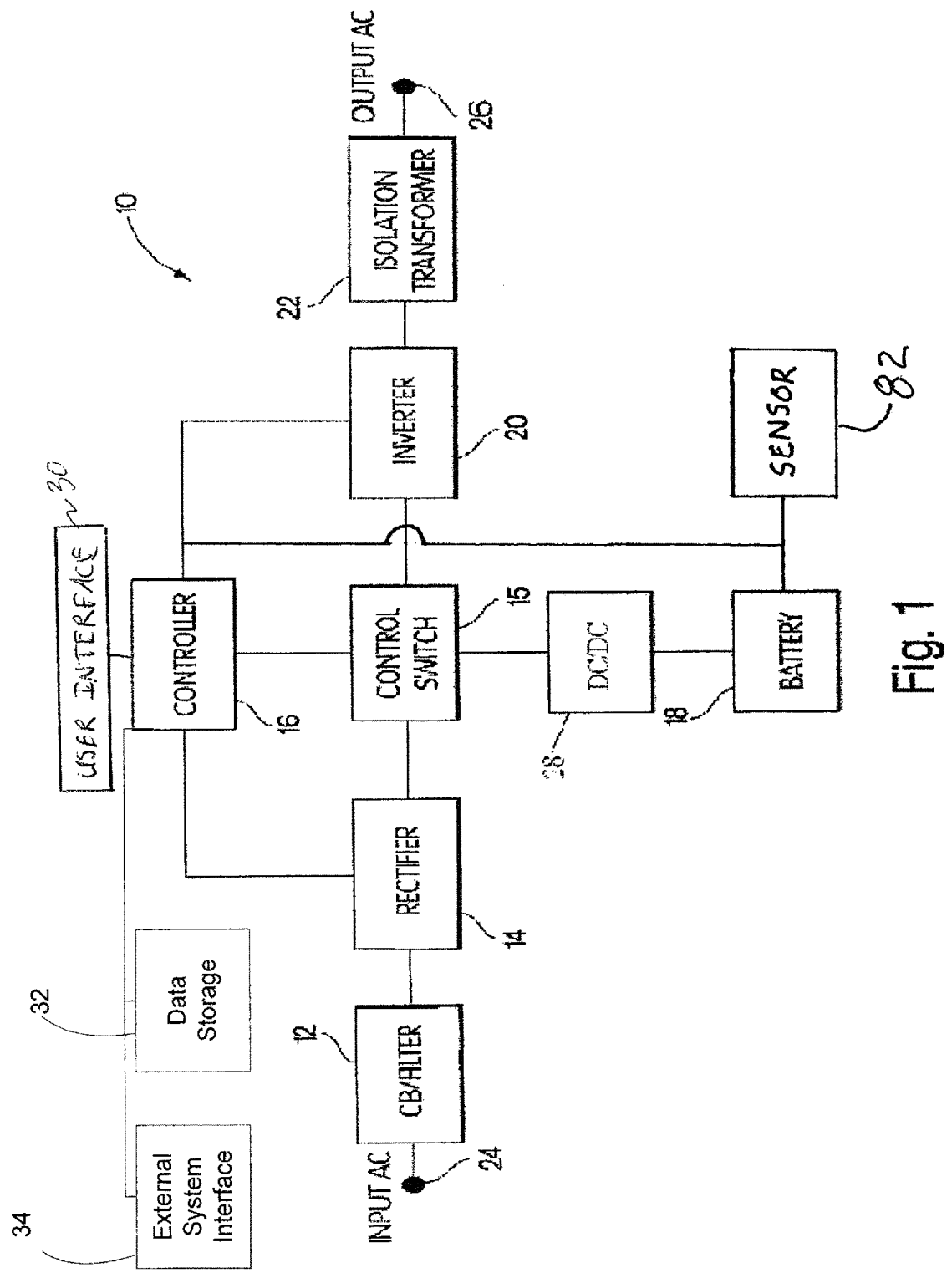
FIG. 1 is a schematic block diagram of a UPS according to one example of the invention.

Some examples in accordance with the present invention relate to systems and processes for updating firmware on a UPS. A conventional firmware update process may include replacing the current or the old firmware file, program or image stored in the memory of the UPS with a new firmware file, program or image. The new firmware file is stored on an external medium such as computer storage or a readable medium. The new firmware file is transferred from that other location through a communication link with the UPS. The new firmware file is written over the current firmware file, replacing any of the previous functionality with newly programmed functionality written into the new firmware file.

The UPS may have also various components or peripherals that may have discrete firmware files designed specifically for those components or peripheral. For example, the user interface, or the display interface may require separate firmware files. The new firmware file may be a file group containing different versions of the firmware file embedded within the firmware file. Many models of UPS devices are available to users, and each model may have a different procedure for updating the firmware on the UPS. The procedure may involve multiple steps that have to be performed precisely to successfully perform the UPS firmware update. Some of the manual steps may require technical knowledge. However, users of the UPS may not have the technical expertise to update the firmware. Further, mistakes made by the user while updating the firmware may cause a UPS to become non-operational, requiring it to be returned to the manufacturer.

To avoid such often costly mistakes, it may be desirable for the UPS manufacturer to develop a system and method that guides the user through the process of updating the firmware on the UPS. The system and method may conceal and automate some of traditionally required steps. The system and method may also provide only the steps relevant to the user of a particular model of the UPS. In addition, the UPS manufacturer, rather than requiring the user to update each firmware file for each component individually, may combine all of the firmware files for different components as well as all the different versions into one firmware file group The firmware manufacturer may also wish to have a way to automate the firmware update process by hiding some of the manual steps from the user. To guide the user through the process the UPS manufacturer may provide the user with a utility that controls the firmware update process and displays visual aids to the user. Such a firmware update utility may be transferred from the manufacturer and run on the computer system connected to the UPS.

The UPS manufacturer may also combine the firmware update utility with the firmware update file group into one firmware installation package. The user may then transfer only the firmware installation package to the computer system, which may contain all the necessary parts to update the firmware on the UPS. As will be discussed in more detail below, such systems and processes may simplify the installation process and allow an unsophisticated UPS user to update the firmware on the UPS.

FIG. 1 shows an on-line UPS 10 used to provide regulated, uninterrupted power in accordance with one embodiment of the disclosure. The UPS 10 includes an input circuit breaker/filter 12, a rectifier 14, a control switch 15, a controller 16, a battery 18, an inverter 20, an isolation transformer 22, a DC/DC converter 28, a user interface 30, data storage 32 and external system interface 34. The UPS also includes an input 24 for coupling to an AC power source, and an outlet 26 for coupling to a load.

The UPS 10 operates as follows. The circuit breaker/filter 12 receives input AC power from the AC power source through the input 24, filters the input AC power and provides filtered AC power to the rectifier 14. The rectifier 14 rectifies the input voltage. The DC/DC converter 28 regulates DC power from the battery 18. The control switch 15 receives the rectified power and also receives the DC power from the DC/DC converter 28. The controller 16 determines whether the power available from the rectifier 14 is within predetermined tolerances, and if so, controls the control switch 15 to provide the power from the rectifier 14 to the inverter 20. If the power from the rectifier 14 is not within the predetermined tolerances, which may occur because of "brown out" or "black out" conditions, or due to power surges, then the controller 16 controls the control switch 15 to provide the DC power from the battery 18 via DC/DC converter 28 to the inverter 20.

In the shown embodiment, the controller 16 is coupled to the rectifier 14, the control switch 15 and the inverter 20. The controller 16 is configured to receive information from the rectifier 14 when a "brown out" or "black out" condition occurs. Such a condition may occur when power to the input 24 is terminated. In other embodiments, the controller may be coupled the other components of the UPS 10 including the input 24, the breaker/filter 12, the isolation transformer 22, the DC/DC converter 28 and/or the battery 18.

In an alternative example, the battery is coupled to the rectifier circuit and the rectifier functions as a boost converter on-line mode of operation and on-battery mode of operation as described in U.S. Pat. No. 7,402,921, entitled "Method and Apparatus For Providing Uninterruptible Power," issued Jul. 22, 2008, which is hereby incorporated herein by reference in its entirety.

The inverter 20 of the UPS 10 receives DC power and converts the DC power to AC power and regulates the AC power to predetermined specifications. The inverter 20 provides the regulated AC power to the isolation transformer 22. The isolation transformer 22 is used to increase or decrease the voltage of the AC power from the inverter 20 and to provide isolation between a load and the UPS 10. The isolation transformer 22 is an optional device, the use of which is dependent on UPS output power specifications. Depending on the capacity of the battery 18 and the power requirements of the load, the UPS 10 can provide power to the load during brief power source dropouts or for extended power outages or when power to the UPS is otherwise compromised.

Using data stored in associated memory, the controller 16 performs one or more instructions or procedures that may result in manipulated data, and the controller monitors and controls operation of the UPS 10. In some examples, the controller 16 may include one or more processors or other types of controllers. In one example, the controller 16 is a commercially available, general purpose processor. In another example, the controller 16 performs a portion of the functions and processes disclosed herein on a general purpose processor and performs another portion using an application-specific integrated circuit (ASIC) tailored to perform particular operations. As illustrated by these examples, embodiments in accordance with the present disclosure may perform the operations and processes described herein using many specific combinations of hardware and software and the disclosure is not limited to any particular combination of hardware and software components.

The data storage 32 stores computer readable information required for the operation of the UPS 10. This information may include, among other information, data subject to manipulation by the controller 16 and instructions that are executable by the controller 16 to manipulate data. Thus, in some embodiments, the data storage 32 can receive and store or retrieve and provide this computer readable information. The data storage 32 may include relatively high performance, volatile, random access memory such as a dynamic random access memory (DRAM) or static memory (SRAM) or may include a nonvolatile, non-transitory storage medium such as read-only memory (ROM), magnetic disk, flash memory, CD, DVD or one or more electrical switches, such as a dip switch. In one example, the data storage 32 includes both volatile and non-volatile storage. Various examples in accordance with the present invention can organize the data storage 32 into particularized and, in some cases, unique structures to perform the aspects and functions disclosed herein. In addition, these data structures may be specifically configured to conserve storage space or increase data exchange performance.

The external system interface 34 exchanges data with one or more external devices. These external devices may include any device configured to communicate using standards and protocols supported by the UPS 10. Examples of specific standards and protocols that the external system interface 34 may support include parallel, serial, and USB interfaces.

Figure 2:
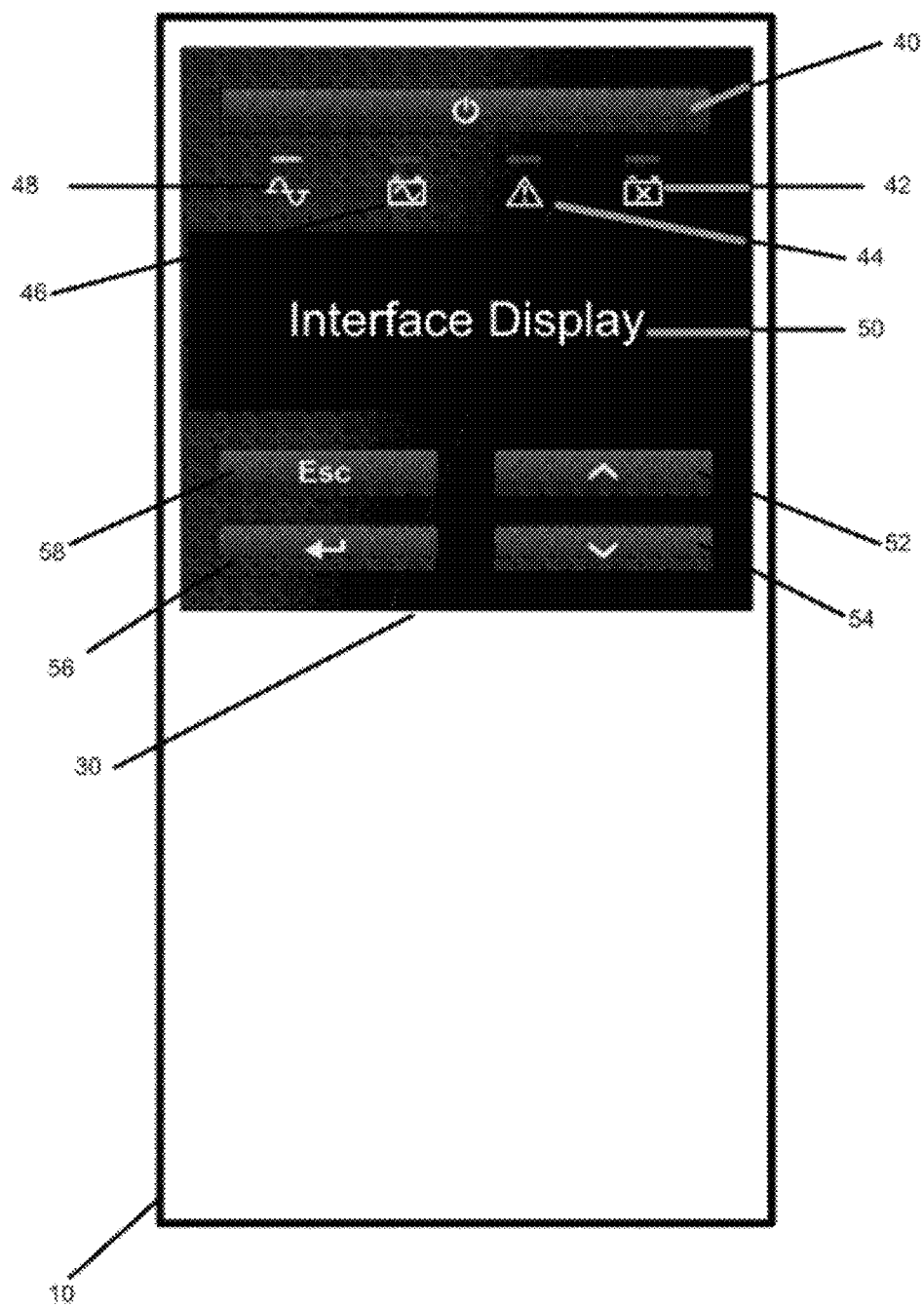
FIG. 2 is a perspective view showing a user interface of the UPS according to one example of the invention.

Referring to FIG. 2, the exemplary user interface 30 includes a display screen and a set of keys through which a user of the UPS 10 can monitor, control and configure operation of the UPS 10. FIG. 2 depicts an external view of the UPS 10 including the user interface 30. The user interface 30 includes a power button 40, a replace battery indicator 42, a warning indicator 44, an on-battery power indicator 46, an on-line power indicator 48, an interface display 50, a scroll up button 52, a scroll down button 54, an enter button 56 and an escape button 58. The user interface 30 may employ any type of display or display screen known in the art.

The user interface 30 functions as follows. The power button 40, when actuated, will cause the UPS 10 to toggle between power-on and power-off states. According to some embodiments, the UPS 10 performs a series of accompanying actions to better manage these power state transitions.

The set of indicators 42, 44, 46 and 48 provide various information regarding current and prior states of the UPS 10. For example, the UPS 10 may determine by running a self-test that the battery 18 needs to be replaced. In this instance, the UPS 10 illuminates the replace battery indicator 42 to communicate this need.

The on-line power indicator 48 and the on-battery power indicator 46 signal the current source of power to the load. An active on-line power indicator 48 signals that the UPS 10 is providing power to the load in a normal operating fashion, i.e., the source of the power is the AC received through input 24. Conversely, the active on-battery power indicator 46 signals that the source of the power to the load is battery 18.

In another example, the UPS 10 may determine, for a variety of reasons, that the attention of an operator is needed. The reasons may include, among others, detection that the battery 18 is disconnected or that the battery 18 has been depleted by the load. In this case, the UPS 10 signals the need for operator attention by activating the warning indicator 44. In addition, the UPS 10 may provide a description of the reason for the warning in the interface display 50.

The interface display 50, which can be fashioned by a variety of hardware components including Liquid Crystal Displays and Light Emitting Diodes, presents a wide variety of information to a user. In one example, the interface display 50 is an alphanumeric display that can display numerical and textual information. This information may include monitoring information, such as the status warnings discussed above. In addition, this information may include configuration information and prompts through which the UPS 10 collects information from the user.

Figure 3:
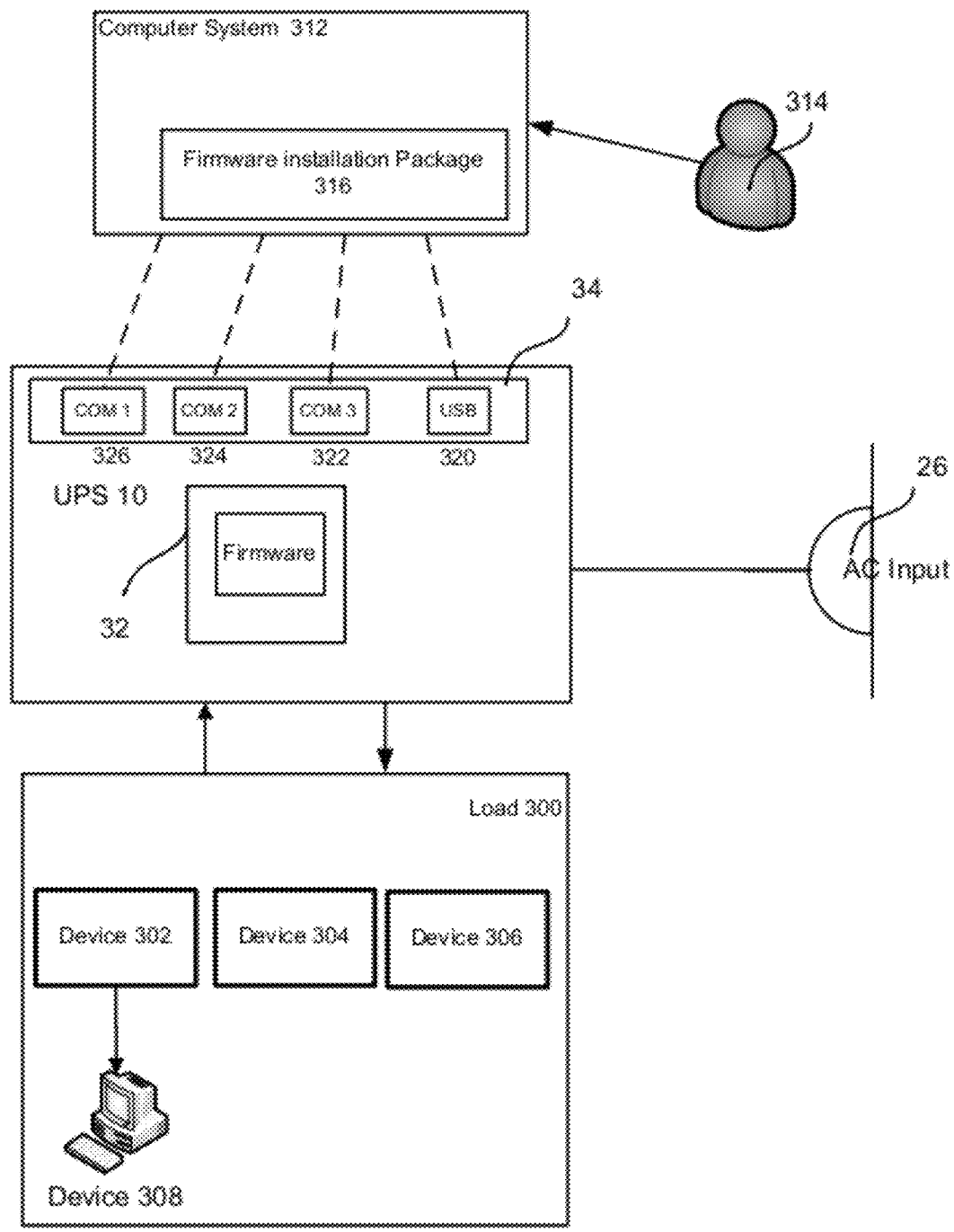
FIG. 3 is a schematic block diagram of a firmware update system according to one example of the invention.

Various examples in accordance with the present invention include systems and processes for updating firmware on a UPS. FIG. 3 illustrates an example of such a system that may be used to update the firmware on a UPS. As shown, the example system of FIG. 3 includes the UPS 10, which includes the data storage 32, which includes a current version of firmware, the external system interface 34, which includes communication ports 320, 322, 324, and 326, a load 300, a computer system 312, which includes a firmware installation package 316 that may include a firmware update file group 318 (shown in FIG. 5) and a firmware utility 500 (shown in FIG. 5), and a user 314. In these examples, the user 314 desiring to update the current version of the firmware on the UPS 10 may connect to the UPS 10 through the computer system 312 and facilitated by the external system interface 34. As discussed above, the UPS 10 includes the outlet 26 and the external system interface 34. The external system interface 34 may include one or more communication ports 320, 322, 324 and 326. The computer system 312 may include the firmware installation package 316 stored into memory. The communication ports may allow serial, parallel, or USB connections. The load 300 includes various devices, peripherals or connected equipment 302, 304 and 306, each of which are coupled to, and receive power from, the outlet 26. In addition, device 302 includes an attached device or peripheral device 308. As shown, the connected equipment or the devices 302, 304 and 306 are coupled to, and receive data from, the external system interface 34 of the UPS 10.

In the example shown, the UPS 10 gathers, stores and provides system information for itself and the elements of the load 300. In this example, the UPS 10 gathers configuration management information for devices or connected equipment 302, 304 and 306 by requesting the configuration management information via the external system interface 34. In response to this request, the devices 302, 304 and 306 provide the requested configuration management information to the UPS 10 via the external system interface 34. In addition, the device 302 provides configuration information regarding the peripheral device 308. The UPS 10 also gathers configuration management information regarding itself and its components, including any installed peripherals. The UPS 10 then stores this configuration management information in the data storage 32 for later use. Other examples of determining, identifying retrieving, storing of system information about UPS and management information for the load 300 are detailed in U.S. patent application Ser. No. 12/412,883 entitled "SYSTEM AND METHOD FOR GATHERING INFORMATION USING A POWER DEVICE" filed Mar. 27, 2009, which is hereby incorporated herein by reference in its entirety.

Referring again to the example of FIG. 3, the UPS 10 can display the system information in the interface display 50 of the user interface 30 so that the user 314 can review the information. In various examples, the system information can be sent to the computer system 312. In various examples, the screens and elements used to display the system information are positioned in various locations throughout an interface structure employed by the UPS 10. One such example is detailed in U.S. patent application Ser. No. 12/412,582, entitled "SYSTEM AND METHOD FOR ALTERING A USER INTERFACE OF A POWER DEVICE," filed Mar. 27, 2009, which is hereby incorporated herein by reference in its entirety.

Other elements of system information regarding the UPS 10, components of the UPS 10, peripherals of the UPS 10, or devices, equipment or peripherals connected to UPS 10 may be collected by the UPS 10 and stored in the data storage 32 for later use. In examples in accordance with the present invention include, among other system information, the efficiency of the UPS 10, the serial number of the UPS 10, the date that the UPS 10 was manufactured, the version of firmware of the UPS 10, the version of the hardware of the UPS 10, the version of the firmware of the interface display 50, results of the latest automatic self test, transfer and fault logs, and values assigned to operational parameters of the UPS 10, such as the current language used by the UPS 10, the input power quality to the UPS 10 and the name of the UPS 10.

Examples of system information regarding peripherals or components of the UPS 10 include, among other information, the date the battery 18 was installed in the UPS 10, the model number of the battery 18, and an indication of external battery packs coupled to the UPS 10.

Examples of system information regarding devices, peripherals or equipment connected to the UPS 10 include, among other information, Watts of real power consumed by the device over a range of time, the name and version of software processes, such as applications, virtual machines and operating systems, that are being executed on the devices, the type of connection coupling the devices to the external system interface 34, and the protocol used to communicate with the devices.

Referring to the example of FIG. 3, the UPS 10 may contain a current version the firmware. The firmware may be stored permanently in read-only memory of the UPS 10. The firmware may contain instructions defining core functions of the UPS. By way of example, some of the core functions could be UPS communication instructions for communicating with the equipment connected, such as devices 302, 304 and 306, or various functions or displays available to the user 314 on the display interface 50 part of the user interface 30. The user 314 may desire to update the current firmware to a new firmware for a number of reasons. For example, the UPS manufacturer may wish to add new functionality to the UPS 10, which is currently not available to the user 314 of the UPS 10. Alternatively, there may be various errors during operation of the UPS 10 that prevent the UPS 10 from functioning in a way desired by the user 314. Alternatively, the UPS manufacturer may wish to update the firmware for the UPS to function more efficiently.

In one example, the UPS manufacturer can notify the user 314 that a firmware upgrade is available for the UPS 10. In another example, the user 314 may periodically check the manufacturer's website to determine if a new version of the firmware is available. In another example, the user may also obtain a firmware update by calling technical support of the UPS manufacturer. The user may call technical support because the UPS may exhibit less than desired performance, the user may have questions about the UPS or the UPS may display an error. Technical support may let the user 314 know that a firmware update is available for the UPS and direct the user 314 to the manufacturer's website to download the firmware.

In one embodiment, the firmware update may be performed by downloading a firmware installation package 316 to the computer system 312. The user 314 can connect computer system 312 to access UPS 10 through the external system interface 34 to update the firmware stored on the UPS 10. The user 314 may connect the computer system 312 to the UPS 10 through a serial connection. In other examples, the user 314 may connect the computer system 312 to the UPS 10 by any of the methods described above including USB or firewire. The computer system 312 may have the firmware installation package 316 containing the firmware update utility and the firmware file group 318 stored into memory of the computer system 312. The firmware installation package, including the firmware file group and the firmware utility may also be stored on a CD, a DVD, a USB drive or a floppy disk.

Figure 4:
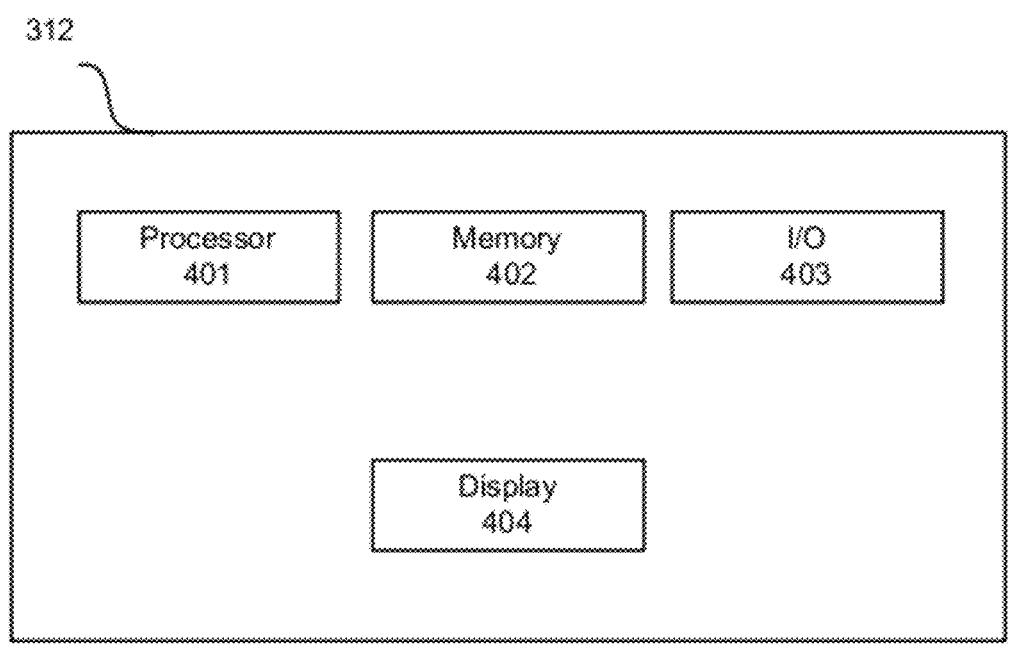
FIG. 4 is a schematic block diagram of a computer system according to one example of the invention.

Various examples in accordance with the present invention include computer systems for communicating with the UPS 10. FIG. 4 illustrates an example of such a computer system that may be used to connect to the UPS 10 to update the firmware on the UPS 10. As shown, the example computer system of FIG. 4 includes a processor 401 connected to a memory 402, I/O 403 and a display 404. Referring to the example of FIG. 4, the computer system 312 may be implemented on various types of computer systems. The computer system 312 may include one or more memory devices, such as a disk drive, memory, or other device for storing data. Memory is typically used for storing programs and data during operation of the computer system 312.

Computer system 312 typically includes a storage mechanism as a part of memory 402 or other storage that includes computer readable and writeable nonvolatile, non-transitory recording medium in which signals are stored that define a program to be executed by the processor or information stored on or in the medium to be processed by the program. The medium may, for example, be a disk, flash memory, EEPROM, RAM, or the like. Typically, in operation, a processor 401 causes data to be read from the nonvolatile, non-transitory recording medium into another memory that allows for faster access to the information by the processor than does the medium. This memory is typically a volatile, random access memory such as a dynamic random access memory (DRAM) or static memory (SRAM). This memory may be located in a storage system, or in memory system 402.

The processor 401 generally manipulates the data within the memory and then copies the data to the medium after processing is completed. A variety of mechanisms are known for managing data movement between the medium and the memory elements, and the processor is not limited thereto. It should be appreciated that the invention is not limited to a particular memory system or storage system.

The computer system 312 may include specially-programmed, special-purpose hardware, for example, an application-specific integrated circuit (ASIC). Aspects of the computer system may be implemented in software, hardware or firmware, or any combination thereof. Further, such methods, acts, systems, system elements and components thereof may be implemented as part of the computer system described above or as an independent component.

Although computer system 312 is shown by way of example as one type of computer system upon which various aspects may be practiced, it should be appreciated that aspects of the computer system are not limited to being implemented on the computer system as shown in FIG. 4. Various aspects of the computer system may be practiced on one or more computers having a different architecture or components that that shown in FIG. 4.

Computer system 312 may be a general-purpose computer system that is programmable using a high-level computer programming language. In computer system 312, the processor 401 is typically a commercially available processor such as the well-known Pentium class processor available from the Intel Corporation. Many other processors are available. Such a processor usually executes an operating system which may be, for example, the Windows NT, Windows XP, Windows Vista, or Windows 7, operating systems available from the Microsoft Corporation, MAC OS System available from Apple Computer or UNIX available from various sources. Many other operating systems may be used.

The processor 401 and operating system together define a computer platform for which application programs in high-level programming languages are written. It should be understood that this disclosure is not limited to a particular computer system platform, processor, or operating system. Also, it should be apparent to those skilled in the art that the system is not limited to a specific programming language or computer system. Further, it should be appreciated that other appropriate programming languages and other appropriate computer systems could also be used.

The computer system 312 may include a display screen 404, which can be fashioned by a variety of hardware components including Cathode Ray Tube (CRT), Liquid Crystal Displays (LCD), Plasma and Light Emitting Diodes (LED), presents a wide variety of information to the user. The computer system 312 also includes one or more I/O devices 403 (e.g., ports, devices, systems, etc.) for inputting and outputting data. In addition, computer system 312 may contain one or more interfaces that connect computer system 102 to a communication network. Computer system 312 may be capable of learning one or more protocols used to communicate by one or more systems.

It should be appreciated that the computer system is not limited to executing on any one particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the system may be implemented as programmed or non-programmed elements, or any combination thereof.

Figure 5:
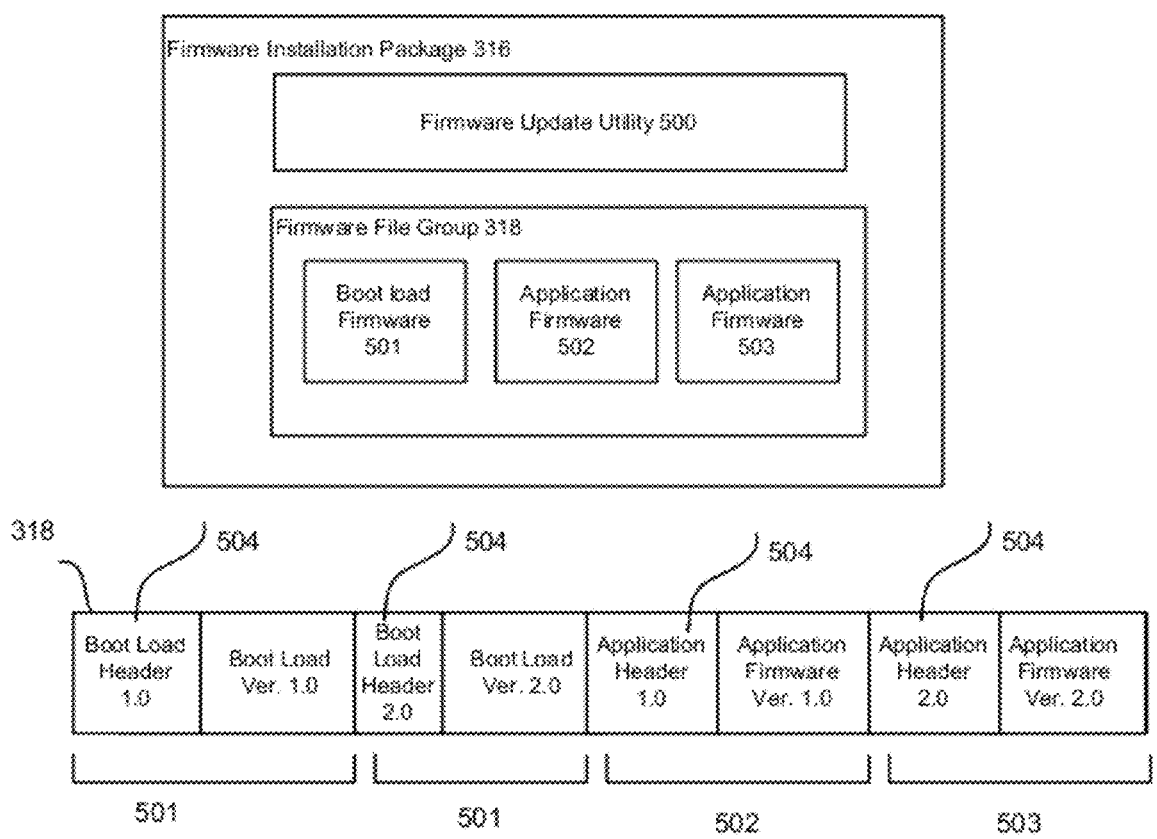
FIG. 5 is a schematic block diagram of a firmware update file group and a firmware update installation package according to one example of the invention.

Various examples in accordance with the present invention include systems for updating firmware on UPS 10. FIG. 5 illustrates an example of such a system, including the firmware update installation package which the UPS manufacturer may provide to the user 314 to update firmware on UPS. As shown, FIG. 5 includes a firmware installation package 316, the firmware utility 500, the firmware file group 318 which may include different versions of the boot load firmware 501, and different version of the application firmware 502 and 503 corresponding to different models of the UPS or different components located in the UPS. As shown in FIG. 5, the firmware file group 318 may contain multiple firmware files embedded within. In one example, and as discussed above, by transferring a single firmware installation package 316, the user 314 may simultaneously update multiple components or peripherals of the UPS. In another example, the firmware installation package 316 may only contain one version of the firmware utility 500, one version of the firmware file group 318, containing one version of the boot load firmware 501 and one version of the application firmware 502. The user prior may determine which of the installation packages is appropriate for the UPS the user employs. Alternatively, the firmware installation package 316 may have any combination of firmware update files containing different combination or number of versions of the boot load firmware files and application firmware files.

In one example, the firmware file group 318 may allow the user 314 to update the boot load firmware 501, as well as, the application firmware 502 in a single firmware update process. For example, the controller 16 in UPS can execute only program code found in data storage 32 or more specifically in Read-Only Memory (ROM) and Random Access Memory (RAM). When the UPS is first powered on, the operating system, which may be necessary to run UPS 10, is not loaded into either ROM or RAM. The UPS may initially execute a boot load program in ROM along with the bare minimum of data needed to access the nonvolatile, non-transitory devices, from which the operating system programs and data are loaded into RAM. The boot load program loads other data and programs which are then executed from RAM on the UPS. The boot load program may have access to other components or peripherals of the UPS which may be necessary for operation of the UPS. If an update of the boot load program is necessary, such update may be required to be performed separately from the application or operating system firmware.

In one example, the firmware file group 318 may allow the user 314 to first update the boot load firmware 501 before updating the application firmware 502. In another example, the boot load firmware 501 may be updated at the same time as the application firmware. In another example, every component or peripheral of the UPS may have boot load firmware. For example, if the UPS contains more than one controller, each controller may have boot load firmware. If the UPS contains more than one controller, the UPS may have one main controller that may have some command over the other controllers.

The firmware update utility located on the computer system 312 may be able to send a command to the UPS that will allow the UPS to enter into boot load mode. The computer system 314 may then send one or more new firmware files to the UPS and load those new firmware files into memory. In one example, if the UPS contains more than one controller, the main UPS controller may send a command to the rest of the controllers to enter into boot load mode. The main controller may forward a firmware update file from one controller to the next. Each controller may determine if firmware update file is intended to be installed on the controller. If the controller determines that the firmware update file is not intended for this controller, the controller may send the firmware update file to the next controller. The controllers may be connected serially. Alternatively the controllers may be connected in parallel.

Firmware file group 318 may also contain multiple firmware update files of different versions for multiple components models of the UPS, UPS peripherals and applications. For example, firmware file group 318 may contain one or more firmware update files embedded within the same file group for different models of the UPS and different components or peripherals part of the UPS. In another example, firmware file group 318 may contain different versions of the firmware files. For example, the firmware file group 318 may contain versions 1.0, 1.1 and 2.0 of the firmware files. In another example, the firmware file group 318 may contain firmware files for different components or peripherals of the UPS. For example, the firmware file group may contain firmware updates that affect the operation of the user interface, or interface display.

As described above, the computer system 312 may access the system information from the UPS. As described above, the UPS can gather, store and provide system information for itself and the elements of the load 300. In one example, the UPS can also gather configuration management information for the devices or equipment connected to the UPS by requesting the configuration management information via the external system interface 34. For example, the computer system 312 may determine the serial number of the UPS, the date that the UPS was manufactured, the current version of firmware of the UPS, the version of the hardware of the UPS, the version of the firmware of the interface display 50, and the name of the UPS.

In one example, the firmware update file group 318 may contain headers 504. Headers 504 may be stored at the beginning of each of the embedded firmware files. A header may also be stored at the beginning of the entire firmware update file group 318. The headers 504 may contain information about the firmware files that follow. For example, information may include, the model of the UPS the firmware file is compatible with, the component or peripheral associated with the firmware file, the version of the firmware file, the file or file group checksum, the length of the file within the firmware file group.

In one example, the firmware update utility may only transfer the files or images contained within the firmware file group that are required to update the firmware on the model of the UPS connected to the computer system. The firmware update utility may selectively transfer files by reading the information located in the headers. The firmware update utility may compare the information determined from the headers to the system information obtained from the UPS. The firmware update utility may then determine based on that information whether the file is needed to perform the firmware update. In one example, the file is needed and the firmware update utility sends only that file to the UPS. The firmware update utility may proceed to read the information located in the next header.

In another example, firmware update utility reads the information located in the header and determines that the file is not needed to perform the firmware update. The firmware update utility reads the information regarding the length of the file and proceeds to the end of the file to find the location the next header file. This "skipping" feature may speed the firmware update process by increasing the speed of the firmware download. By only sending the portions of the files necessary for the firmware update on the UPS, the user 314 does not have to wait to download the entire contents of the file group.

In another example, the UPS may perform this "skipping" function. The firmware update utility may only send the header information of each file to the UPS. The UPS may read the header information and compare the header information to the system information detected from the UPS. The UPS may determine if the firmware file relating to the header information is required for updating the UPS. In one example, the file is not required. The UPS may tell the firmware utility not to transmit that file and to proceed to the next file. The firmware update utility may then proceed to the next header. The process is repeated until the UPS receives all the files required for the firmware update.

In one example, the firmware update utility 500 prompts the user to select the firmware file which corresponds to the UPS model connected to the computer system. In one example, after the user selects the firmware file, the firmware update utility 500 determines if to the firmware file selected is compatible with the UPS 10.

In another example, the firmware update utility 500 may determine automatically which firmware file conforms to the UPS model. In one example, based on the information collected from the UPS, the UPS components or peripherals and the UPS connected devices or equipment, the firmware update utility may look up which version of the firmware file is appropriate for the UPS connected to the computer system 312. In another example, the computer system 312 may automatically determine which firmware version of the firmware file conforms to the UPS based on previous firmware revision history. The computer system 312 may determine the version of the firmware file that needs to be installed by accessing the one or more of revisions of the firmware previously installed on the UPS from the system information located in memory of the UPS.

In another example, the computer system 312 may determine information about components of the UPS including the type and model number of the battery installed in the UPS, and an indication of external battery packs coupled to the UPS.

In another example, the computer system 312 may also determine information about the devices or equipment connected to the UPS, including whether power is connected to the devices, the name and version of software processes, such as applications, virtual machines and operating systems, that are being executed on the device, the type of connection coupling the device to the external system interface 34, and the protocol used to communicate with the device.

In one example, the firmware update utility 500 may be able to detect whether power is connected to the devices or equipment connected to the UPS, by detecting whether the UPS has a load. The firmware update utility may notify the user that equipment is connected to the UPS. The firmware update utility may instruct the user to shut down the connected equipment. Alternatively, the firmware update utility may display information about the effects of the firmware update utility on the devices or equipment connected to the UPS.

In another example, after receiving information about the devices or equipment connected to the UPS, the firmware update utility 500 may be able to control one or more of the functions of these devices. For example, the firmware update utility may determine that power is connected to the devices 302, 304 and 306. The firmware update utility 500 may be able to send commands to the devices or equipment 302, 304 and 306 to start the shut down procedure and turn the devices off.

Updating firmware on UPS may be necessary for efficient and error-free operation of the UPS. However, conventional firmware update processes are typically very manual, error-prone and intimidating to unskilled users. Many models of UPS devices are available to users, and each model may have a different procedure for updating the firmware on the device. Mistakes made by the user while updating the firmware may cause a UPS to become non-operational, requiring it to be returned to the manufacturer. To avoid such often costly mistakes, the present embodiment may also comprise a firmware update utility 500. This firmware utility may guide the user 314 through the process of updating the firmware on the UPS.

The firmware update utility 500 may be stored in the memory of the computer system 312. The user may be required to start the firmware update utility 500 before proceeding with the firmware update. The firmware update utility 500 may contain a series of screens designed to guide the user 314 through the firmware update process.

Figure 6:
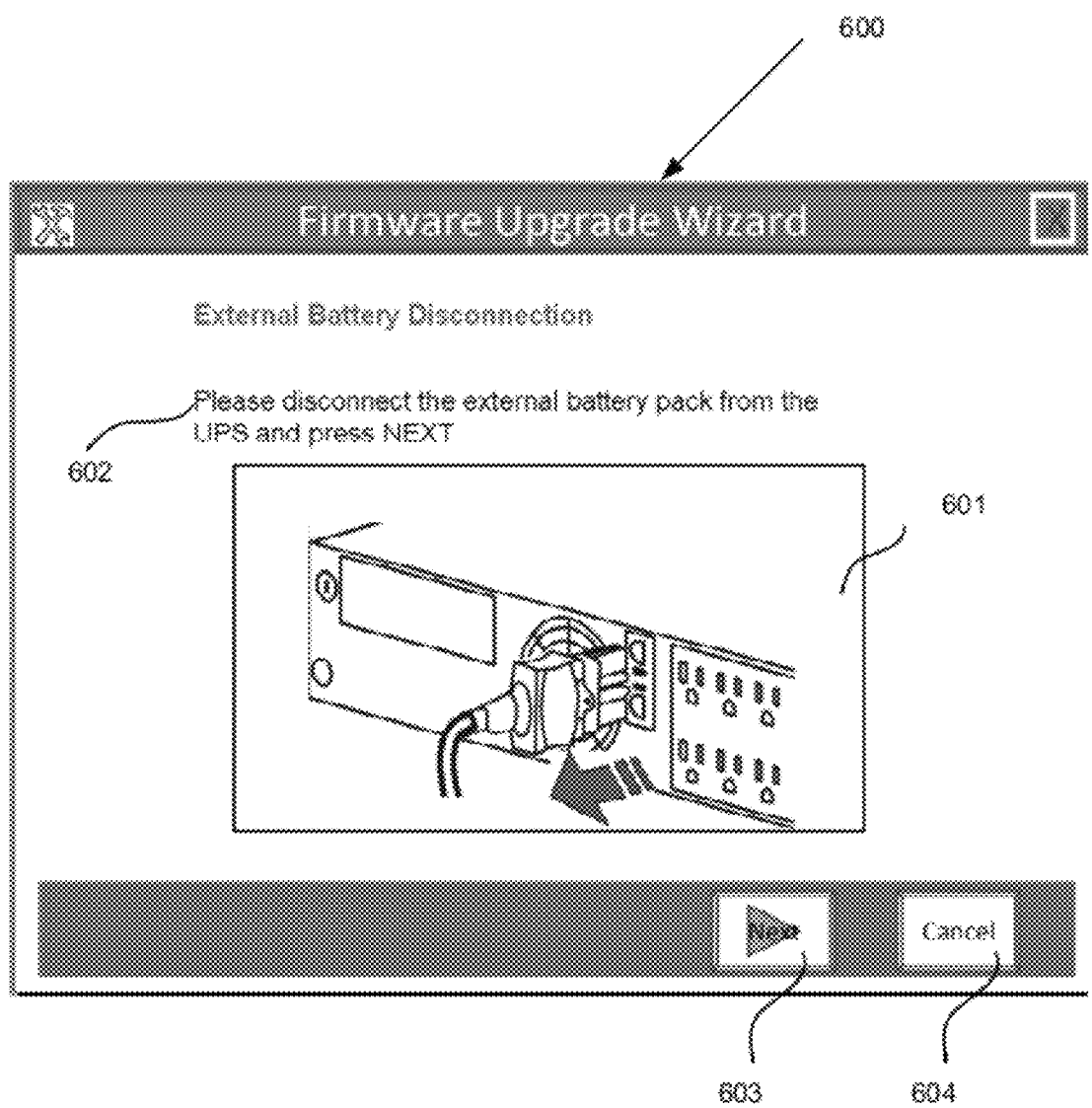
FIG. 6 is a perspective view of one of the screens displayed in the firmware update utility according to one example of the invention.

FIG. 6 depicts one example of such a firmware utility screen. As shown, the firmware utility screen 600 includes displays a graphical illustration 601, instructions 602, as well as, control buttons 603 and 604. The screen displays the graphical illustration 601 and instructions 602, in the form of text, to describe and illustrate each step of the firmware update process to the user 314. For example, the graphical illustration 601 may show the user 314 how to remove a cable from UPS. In another example, the graphical illustration 601 may show how the user 314 can shut down power to the UPS 314. In yet another example, the graphical illustration 601 visually represents connections to devices or connected equipment 302, 304 and 306 in FIG. 3. In another example, the graphical illustration 601 may be a status bar representing the progress of a step in the process. The status bar may visually indicate to the user approximately the time the utility will take to perform a step of the firmware update process. The instructions 602, which may accompany the graphical illustration 601, may explain to the user 314 how to perform the necessary steps. For example, the instructions 602 may explain that power to UPS may need to be turned off. Alternatively, the instructions 602 could assist the user 314 in determining which of the devices or connected equipment 302, 304 or 306 may need to be turned off before proceeding with the firmware update process.

The firmware utility screen 600 may also contain control buttons 603 and 604. These controls may allow the user 314 to move between the screens in the firmware utility 500. In one example, some control buttons may be disabled, preventing the user from moving to the next screen until the user selects one of the options on the screen. In another example, the control buttons 603 and 604 may be disabled until the user performs a necessary action. The user may also be prevented from returning to a previous screen or continuing to a subsequent screen until the user performs that necessary action. In one example, the user may be prevented from returning to the previous screen when specific steps have already been performed in the firmware update process. For example, when installing boot load firmware, allowing the user to return to a previous screen might render the UPS inoperable. This disabling feature may prevent the user from improperly installing the firmware update or from causing the UPS to become non-operational.

For example, the firmware update utility 500 may instruct the user to connect to the computer system to the UPS through one of the communication ports on the external system interface of the UPS. The screen 600 may display the graphical illustration 601 corresponding to the external system interface of the UPS. The firmware update utility may determine whether the user performed this connection step and whether the UPS is connected to the computer system. The firmware update utility may also determine the communication port to which the computer system is connected. The firmware update utility 500 may display a status screen while the firmware update utility detects the UPS connection and the communication port. The user may be prevented from proceeding to subsequent screens until these connection steps are performed.

In another example, the screen 600 may be a permission screen. The firmware update utility 500 may be able to control various functions of the UPS without user involvement. However, the firmware update utility may ask for the user to acknowledge or allow for the firmware update utility to control one of the functions of the UPS. The firmware update utility may display the permission screen to the user that will explain the function the firmware update utility is about to perform. For example, the firmware update utility may be able to shut off UPS output power to the connected devices or equipment 302, 304 and 306. Before turning off output power to the devices or equipment, the firmware update utility may show the user a permission screen. The permission screen may display to the user the option to allow the firmware update utility to turn output power off on the UPS. The permission screen may also display to the user the option to return to the previous screen. In another example, the firmware update utility may turn power off to the UPS, or perform a restart sequence. The options may be in the form of control buttons 603 or 604. In one example, once the user selects the control button that will allow the firmware update utility perform the function, the firmware update utility may send a command to the UPS to perform that function.

Figure 7:
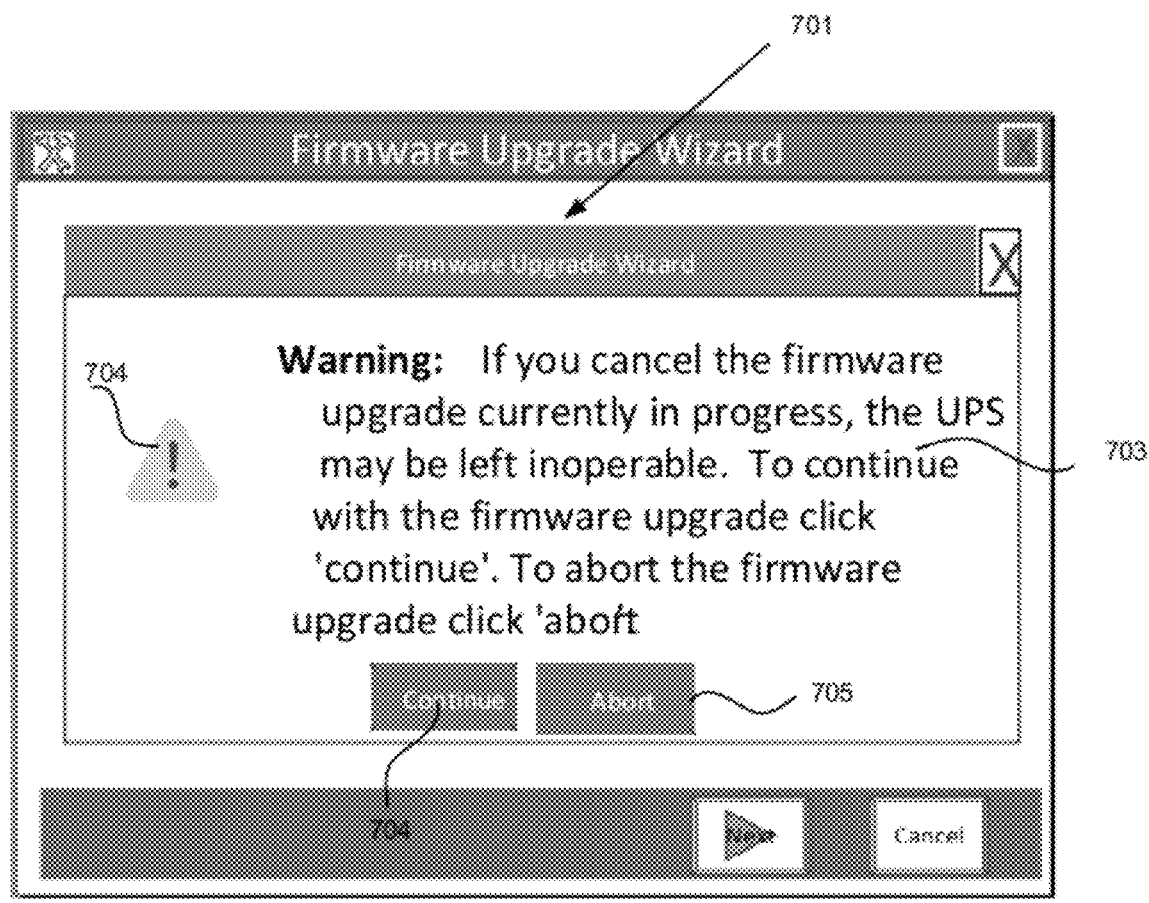
FIG. 7 is a perspective view of one of the warning screens displayed in the firmware update utility according to one example of the invention.

The firmware utility screen 600 may also contain one or more warning screens that may alert or advise the user 314 of a certain condition. FIG. 7 depicts an example of such a warning screen. As shown, the warning screen 701 includes warning graphics 702, warning text 702 and control buttons 703 and 704. Such warning screens may appear to the user 314 when the user 314 performs an action that could potentially harm the UPS 10 or interrupt the firmware update process in a way that is harmful to the UPS. The warning screen 701 may contain warning graphics 702, warning text 703 and control buttons 704 and 705, in various locations of the screen, to attract the user's attention. The control buttons 704 and 705 may allow the user 314 to abandon the firmware update process after being warned of the potential harm to the UPS 10. The control buttons 704 and 705 may also allow the user 314 to return and to continue the firmware update process. In another example, the warning screen 701 may alert the user 314 to perform a necessary action before proceeding with the firmware update process. The control buttons 704 and 705 may allow the user 314 to return to the firmware update process after completing the necessary action.

For example, it may be desirable to power down the devices 302, 304, 306 and 308, which may be connected to the UPS or connected to one of the devices. The firmware update utility may detect whether the UPS has a load. If the UPS has a load, equipment 302, 304 or 306 may be connected to the UPS. In one example, the UPS may determine if there is power supplied to these devices. The firmware update utility may display the warning screen 701 that may alert the user that devices are connected to the UPS. The firmware update utility may also determine the effects the firmware update on the devices 302, 304, and 306. The warning screen 701 may alert the user to power down the devices 302, 304 and 306. The firmware update utility 500 may determine whether the user powered down the devices. The firmware update utility 500 may allow the user to proceed to the next screen even if the user did not power down the devices. In one example, the firmware update utility may display a permission screen and perform the function. Alternatively, the firmware update utility may disable the control buttons 704 or 705 until the user powers down the devices 302, 304 and 306.

Figure 8:
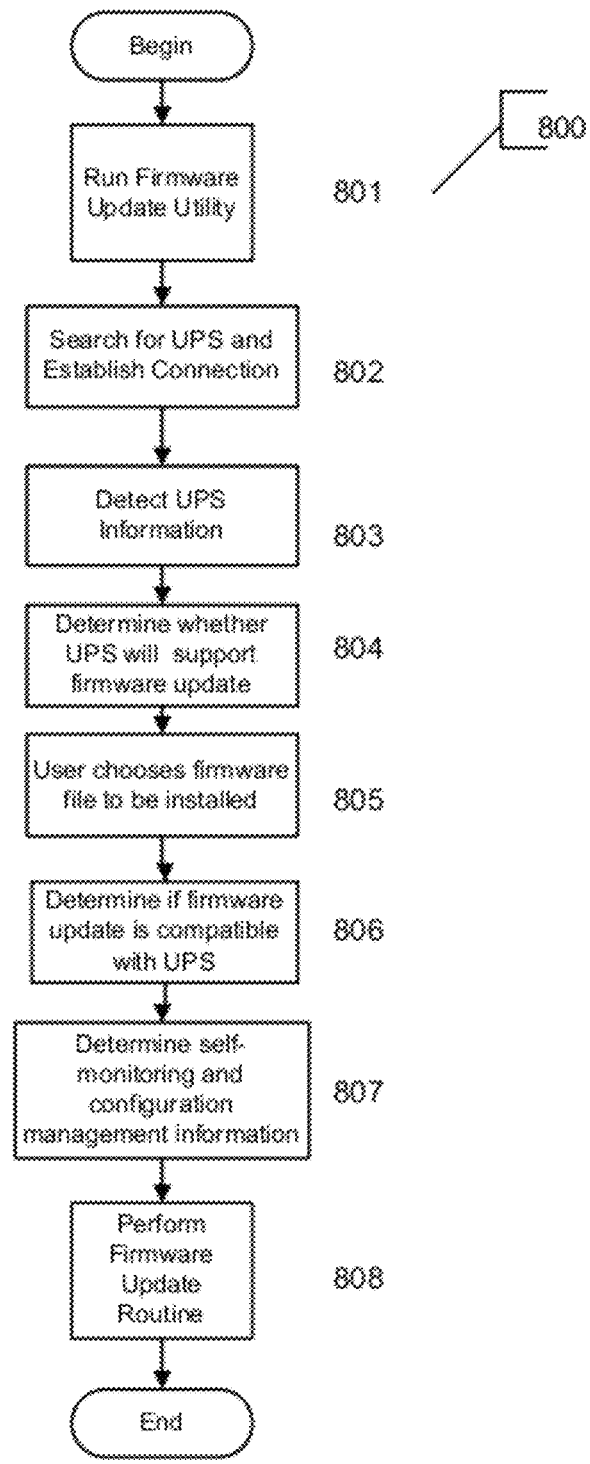
FIG. 8 is a flow chart of a preparatory portion of the firmware update process according to one example of the invention.

Before the firmware update process is performed, the firmware update utility may guide the user through a number of steps to prepare the UPS for the firmware update process. This preparation sequence or procedure may be needed to put the UPS 10 in the condition to accept the firmware update. FIG. 8 illustrates one example of a preparation process 800 for preparing the UPS for the firmware update. The process 800 may include the acts of running firmware update utility, searching for a UPS and establishing a connection with UPS, detecting UPS information, determining whether the UPS will support the firmware update, whether the firmware file is compatible the UPS, determining which files embedded in the firmware file group will be transmitted, determining information about the UPS and devices connected to the UPS and performing the firmware update. The process 800 begins at block 801. At block 801, the user 314 initiates the firmware update utility 500 on the computer system 312. The firmware update utility 500 displays the firmware utility screens described in FIG. 6 and FIG. 7.

At block 802, the screens display to the user the instructions on how to establish a connection between the UPS 10 and the computer system 312. The user follows the instructions, establishing a connection between the ports of the I/O 403 of the computer system 312 and the external system interface 34 of the UPS. Once the connection is verified, the firmware update utility 500 detects UPS information at block 803. The firmware update utility 500 may detect UPS information by reading the system information stored in data storage 32 of the UPS.

At block 804, the firmware update utility 500 may determine whether the UPS 10 will support the firmware update and the type of version of the set of screens the firmware utility will need to run. For example, some models of UPS will require the user to perform a restart sequence. The restart sequence may contain one or more additional steps to allow the firmware update utility 500 to update the UPS. Other UPS models may be able to accept a remote instruction or command from the computer system 312 to control functions of the UPS, to prepare it to accept the firmware update. In one example, the particular UPS models may not be able to support the firmware update. In another example there may not be a firmware update file available for the model of the UPS.

At block 805, in one example, the firmware update utility 500 may automatically determine which version of the firmware is required to update the UPS based on the UPS information determined at block 803. In another example, the firmware update utility 500 may prompt the user to select the firmware file the user wishes to install. In another example, the user may be allowed to choose between selecting the firmware file automatically or manually.

At block 806, in one example, the user selects the firmware update file and the firmware update utility 500 determines whether the firmware file selected in block 805, is compatible with the UPS. At block 807, the firmware update utility may detect system information of the UPS and configuration management information of the devices or equipment 302, 304, and 306 that is connected to the UPS. The UPS may then transmit this information to the firmware update utility 500. To execute the steps necessary to perform the firmware update, the firmware update utility 500 may use this information to alert the user. Once the preparatory steps are performed and the UPS is ready to be updated, the firmware update utility 500 will run the update routine at block 808.

Figure 9:
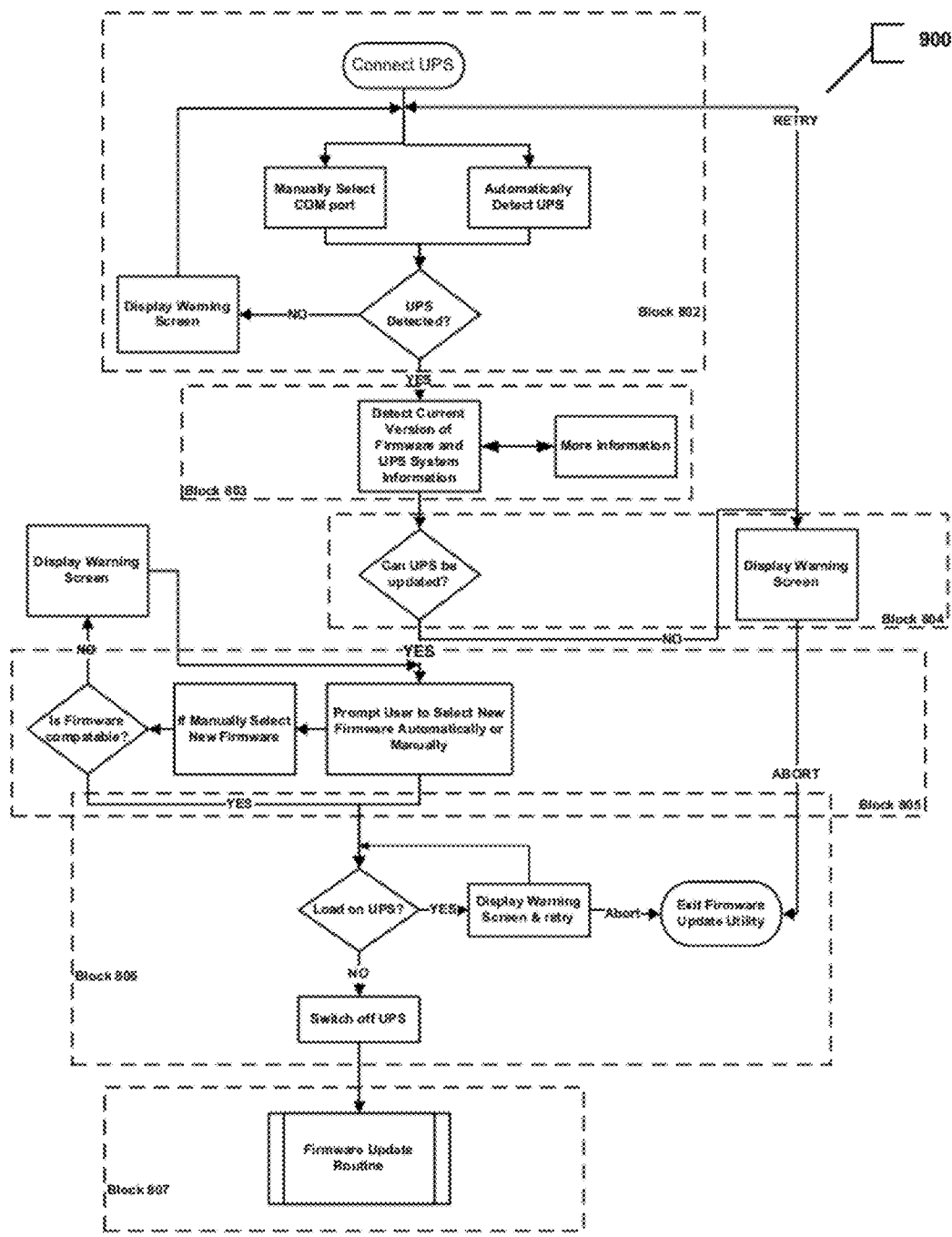
FIG. 9 is a flow chart of the preparatory portion of the firmware update process in greater detail according to one embodiment of the invention.

FIG. 9 shows process 900 which shows additional details for the process 800 according to one example. At block 802, firmware update utility may allow the user to choose whether the firmware update utility 500 automatically detects the UPS connected to computer system 312. The firmware update utility 500 will then attempt to establish a connection on all of the communication ports 320, 322, 324, and 326. Alternatively, the user may be able to connect to the UPS manually. In one example, the firmware update utility 500 may display the list of communication ports 320, 322, 324, and 326. The firmware update utility 500 may only display the communication ports that correspond to ports present on the computer system 312. The user can select the communication port for connection to the UPS. In one example, the firmware update utility 500 will then attempt to establish the connection using the user selected communication port.

At block 803, in one example, the firmware update utility 500 will detect the version of firmware currently installed on UPS and other system information of the UPS, such as the model of the UPS. The user may be able to view more information about the UPS and the firmware installed on the UPS, as well as, other revisions of the firmware previously installed on the UPS.

At block 804, the firmware update utility 500 may determine whether the firmware can be updated on the UPS. If the firmware update is not supported by the UPS, the firmware update utility 500 will display a warning screen to the user. The user can then exit the firmware configuration utility 500. Alternatively, the user may attempt to connect to the UPS again by performing the actions in 802, 803 and 804. In another example, the user may attempt to connect another UPS device to the computer system 312 and run the firmware update utility 500.

In one example, any of the steps of the preparation sequence may be performed without user involvement. While the firmware update utility 500 is performing these acts, the firmware update utility 500 may display a status screen to the user. The status screen may visually indicate to the user approximately the time the utility will take to perform the search, the connection and the compatibility determination. The screen may be displayed until the action is completed. For example, the status screen may be displayed for any appropriate duration such as 3 seconds, 5 seconds, 30 seconds or 1 min. If the UPS is not detected after either the automatic detection process or the manual selection process, the firmware update utility 500 may display a warning screen to the user. The warning screen may allow the user to try the connection step again, repeating the connection process, or go back to one of the previous screens and change the communication port. Alternatively, if the UPS is detected, but no communication is possible with the UPS, a different warning screen may be displayed, alerting the user that communication with the UPS was not possible. The user may be directed to try the process again by repeating the act in 802, 803 and 804. Alternatively, the user may be directed to contact technical support.

At block 805, in one example, the user may be prompted to select the firmware file manually. The firmware update utility 500 may display a file explorer window. The window may only display file types with file extensions that are compatible firmware files. Alternatively, any type of file extensions may be displayed. The user can select the firmware file corresponding to the firmware version the user chooses to update.

If the user selected the firmware version manually, at block 805, the firmware update utility 500 may determine whether the firmware file selected by the user is compatible with the UPS. If the user selects a file that is incompatible with the UPS, the firmware update utility 500 may display a warning screen. The warning screen may alert the user that the file selected is not compatible. The warning screen may have controls that allow the user to try the file selection process again. Alternatively, the warning screen controls may allow the user to exit the firmware update utility 500. If the user selects a file that is not a firmware update file, the firmware update utility 500 may display another warning screen alerting the user that the file selected is not supported.

At block 806 the UPS may detect system information of the UPS and configuration management information of the load 300 and the connected equipment 302, 304, and 306 that are connected to the UPS. The UPS may then transmit this information to the firmware update utility 500. The firmware update utility 500 may use this information to alert the user to execute steps necessary to perform the firmware update. For example, the firmware update utility 500 may determine that connected equipment 302, 304 and 306 will need to be disconnected from the UPS or otherwise the power to the devices will have to be provided from an alternative source. The firmware update utility 500 may also determine that the output power on the UPS is turned on. The firmware update utility 500 may be configured to automatically perform a restart sequence on the UPS by sending a command to the UPS. In another example, the user may have to perform the restart sequence on the UPS manually. In one example, the firmware update utility 500 may display step by step instructions to guide the user through the procedure to manually perform the restart sequence.

The firmware update utility 500 can determine whether the user successfully performed the necessary steps displayed to the user before proceeding to the next step. If the UPS was not restarted, the firmware update utility 500 may display a warning screen to user and allow the user to try to perform the function again. Alternatively, the firmware update utility 500 may continue with the firmware update regardless of the power state of the attached devices. In another example, the firmware update utility 500 may control the functions of the UPS to perform the necessary step. However, the firmware update utility 500 may prompt the user with a permission screen. The screen may obtain permission from the user to perform a step of the process. For example, the screen may notify the user that power to the UPS will be shut down. By selecting for the firmware update utility to proceed to the next step the user allows the firmware update utility to perform that step. Once the UPS has been prepared to accept the firmware update, the firmware update utility 500 performs the firmware update routine at block 807.

In one example, the restart sequence may be different for different models of the UPS. As described above, in one example, the firmware update utility 500 may only display the instructions corresponding to the model of the UPS connected to the computer system. The firmware update utility 500 may only display the instructions corresponding to the restart sequence associated with the model of the UPS connected to the computer system. For example, the restart sequence may be different for models of the UPS containing one or more device components or peripherals. In one example, the specific UPS device component is an external battery pack. The firmware update utility 500 may determine if the UPS connected contains device component. If the UPS contains the component, the firmware update utility 500 may display a screen, alerting the user to the presence of the component and instructions on the procedure for disconnecting or otherwise dealing with the component.

For example, the screen may display instructions and graphical illustrations showing the user how to disconnect the external battery pack from the UPS. The firmware update utility may determine if the user performed the necessary handling step of disconnecting external battery pack from the UPS. If the external battery pack is detected, firmware update utility 500 may not allow the user to continue with the firmware update process until the battery back is disconnected.

In another example, the device component may be an internal battery of the UPS. The firmware update utility 500 may determine if the UPS connected requires the internal battery to be removed before proceeding with the firmware update process. In one example, the restart sequence may also include a step of disconnecting AC utility power to the UPS. The firmware update utility 500 may display a screen instructing the user how to disconnect the AC utility power to the UPS. The firmware update utility may determine if the user performed the step of disconnecting the AC utility power to the UPS. If the AC utility power to the UPS is detected, the firmware update utility 500 may not allow the user to continue with the firmware update process until the AC utility power to the UPS is disconnected.

In one example, the restart sequence may also include a reset sequence. The firmware update utility 500 may display a screen instructing the user how to perform the reset sequence. The firmware update utility may determine if the user performed the step of reset sequence or if the reset sequence was successful. In one example, the reset sequence is successful if the firmware update routine can be performed. In one example, the reset sequence is successful if the firmware update file could be sent to the UPS. If the reset sequence is not successful, the firmware update utility 500 may require the user to repeat the reset sequence again. The firmware update utility 500 may not allow the user to continue with the firmware update process until the reset sequence is successful.

In one example, the reset sequence may comprise a series of steps. The steps may include for the user to interact with the user interface of the UPS. As described above, the user interface of the UPS may include a number of buttons and indicators. For example, the user interface may include a power button, a replace battery indicator, a warning indicator, an on-battery power indicator, an on-line power indicator, a scroll up button, a scroll down button, an enter button and an escape button. The steps in the reset sequence may require the user to hold down one or more of the buttons on the user interface. For example, the button may be the scroll down button or the scroll up button. The user may be required to hold the button down for a period of time. In one example, the user may be required to hold the button down until another step in the reset sequence is preformed. In one example, if the step previous to the reset sequence was to disconnect the AC utility power, the next step in the series of steps may be to reconnect the AC utility power. The next step in the reset sequence may be to wait for period of time before releasing the button on the screen interface of the UPS. For example the time period may be 1 second, 3 seconds, or 10 seconds, or any other period required by the reset sequence.

The next step in the reset sequence may be to disconnect the AC utility power. This step may be required to allow the computer system to transfer one or more of the firmware files to the UPS. The reset sequence may require for the user to repeat any of the steps above until the reset sequence is completed.

Figure 10:
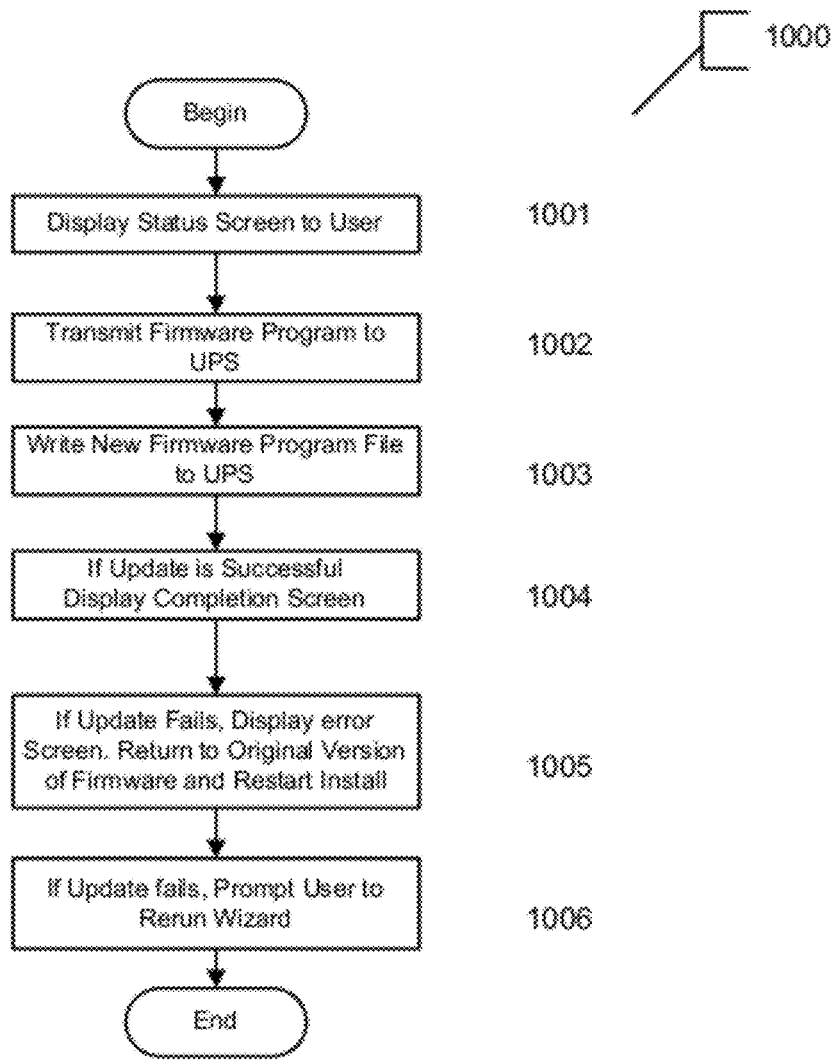
FIG. 10 is flow chart of a firmware update routine of the firmware update process according to one embodiment of the invention.
Figure 11:
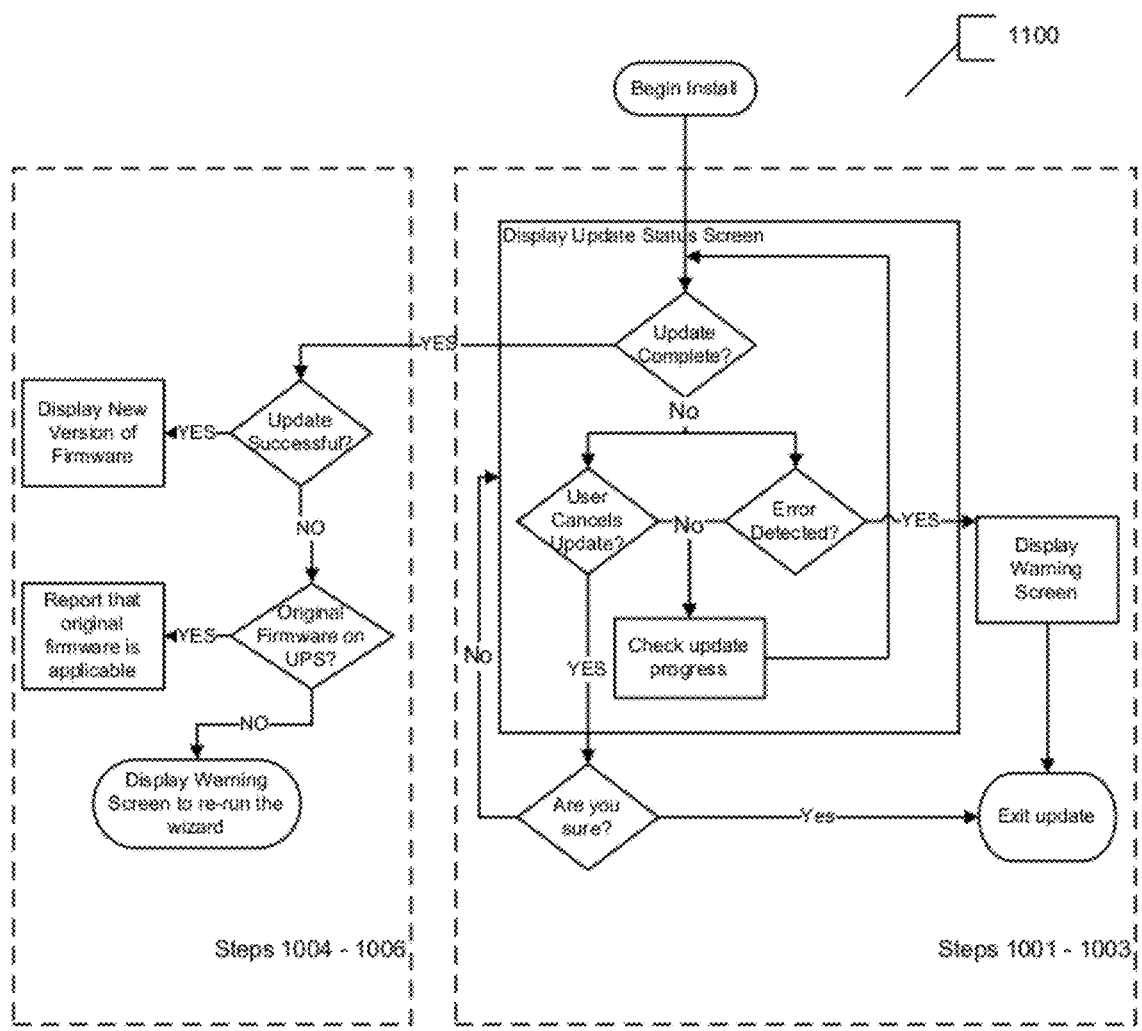
FIG. 11 is a flow chart of the firmware update routine of the firmware update process in greater detail according to one embodiment of the invention.

FIG. 10 and FIG. 11 show an example of the firmware update routine. The process 1000 may include the acts of displaying a status screen to a user, transmitting firmware file to UPS, writing the firmware file to UPS, if the update is successful displaying a completion screen, if the update fails showing an error screen and returning the UPS to original firmware version if possible and if no original firmware is installed, or the UPS is non-operational, alerting the user.

In step 1001, in one example, while the firmware update routine continues, the firmware update utility 500 may display a status screen to the user. The status screen may have a graphic illustration of the progress. The status screen will show the process of the firmware update, and may visually indicate to the user the length of time elapsed since the start of the update and the length of the time to complete the update. In one example, the status screen may correspond to a calculation of the size of the firmware update file that needs to be transferred and the transfer speed of the connection link such as the baud rate.

In one example, the firmware update file may be transferred to the UPS from the computer system 312, in step 1002. The new firmware update file may be written to the UPS to replace the current version of the firmware update file. In one example, the transfer is controlled by a transfer protocol corresponding to the type of communication link set up between the UPS and the computer system 312. The firmware update utility 500 may read the firmware update file to determine whether the file transfer is complete. In one example, if the firmware update file is still being written to the UPS, the firmware update utility may continue to display the status screen to the user.

During the firmware update routine, the user may wish to cancel the firmware update in the middle of the file transfer. The status screen may have a control button that allows the user to cancel. In one example, if the user selects the cancel button, the firmware update utility 500 may display a warning screen. The warning screen may notify the user of potential problems with cancelling the firmware update. The warning screen may have control buttons allowing the user to return to the firmware update or to exit the firmware update. In one example, if the user decides to return to the firmware update, the firmware update may continue. In another example, if the user decides to exit, the firmware update utility may close, which may render the UPS inoperable.

During the firmware update routine, the firmware update utility may detect an error with the firmware update. If an error is detected in the firmware update process, the firmware update utility 500 may display a warning screen to the user.

The warning screen may have control buttons that allow the user to exit the firmware update utility. The warning screen may direct the user to try the firmware update process again. The firmware update utility may then attempt to transfer the new firmware file to the UPS. This transfer will write over any previous versions of the firmware copied to the UPS.

In one example, once the firmware update file has been successfully written to the UPS the firmware update utility 500 will display a completion screen. The completion screen may notify the user that the firmware update was successful. The completion screen may also display the new version of firmware stored on the UPS. The completion screen may notify the user that power to UPS and the devices 302, 304 and 306 may now be turned on. The completion screen may allow the user to see more information about the firmware update. The completion screen may display control buttons that allow the user to exit the firmware update utility 500.

In one example, the firmware update process may complete, however errors encountered during the process may not allow new firmware file to be applied to the UPS. If the original firmware version is still stored in the UPS memory, the firmware update utility 500 may restore the previous version of the firmware on the UPS. The firmware update utility 500 may display a firmware update error screen. The error screen may alert the user that the original version of the firmware is stored on the UPS. The user may be directed to contact technical support. The error screen may also allow the user to see more information about the firmware update, including the firmware version currently installed and any errors which may have been encountered during the process. The error screen may display control buttons that allow the user to exit the firmware update utility 500.

In one example, if the original firmware version is not stored on in the UPS data storage, the firmware update utility 500 may display a firmware update error screen. If the UPS has no firmware stored in UPS data storage, the firmware update utility may direct the user to rerun the firmware update utility. Without any firmware, the UPS may not be able to function. In one example, the boot load firmware may not be running on the UPS, which means that the user cannot update the firmware on the UPS. The user may try to run the firmware update utility again to try to install the boot load firmware. The user may also be directed to contact technical support. The error screen may display control buttons that allow the user to exit the firmware update utility 500.

After the completion of each of the processes, the UPS or the devices attached to the UPS may be in a different state. For example, after the firmware update routine, the reset sequence or the restart sequence are completed the UPS may be powered down, disconnected or have entered another power mode or display mode. In one example, the firmware update utility may display to the user a series of steps, instructing the user how to return the UPS to the state prior to the start firmware update utility. For example, the user may be displayed a series of screens instructing the user to reconnect any of the components the user removed or disconnected. One such component may be the external battery pack. Another such component may be the internal battery. In another example, if the user powered down or disconnected any of the devices or peripherals, the firmware update utility may show the user how to power up or reconnect any of the devices to the UPS.

Each of processes 800, 900, 1000 and 1100 depict one particular sequence of acts in a particular example. Some acts are optional and, as such, may be omitted in particular examples in accordance with the present invention. Additionally, the order of acts can be altered, or other acts can be added, without departing from the scope of the present invention. As discussed above, in at least some examples, the acts deal with data representative of tangible objects. In addition, as discussed above, in at least one example, the acts are performed on a particular, specially configured machine, namely an on-line UPS. Embodiments of the invention may be used with other UPS topologies, including off-line and line interactive UPSs and other topologies. In other examples, the acts are performed on other particular, specially configured power devices such as, among other power devices, outlet strips, power converters, line conditioners, surge protectors, power conditioners, Power Distribution Units (PDU) and Rack PDUs.

Any reference to examples, elements or acts of the systems, machines and processes herein referred to in the singular may also embrace examples including a plurality of these elements, and any references in plural to any example, element or act herein may also embrace examples including only a single element. References in the singular or plural form are not intended to limit the presently disclosed systems, machines or processes, their components, acts, or elements.

Any example disclosed herein may be combined with any other example, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. Such terms as used herein are not necessarily all referring to the same example. Any example may be combined with any other example in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence are intended to have any limiting effect on the scope of any claim elements.

Having thus described several aspects of at least one example of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system for guiding a user through a procedure for updating firmware on an uninterruptible power supply, the system comprising:
    a computer system; and
    a communication link to connect the computer system to the uninterruptible power supply, wherein the computer system includes:
        a discovery component, configured to detect a version of the firmware installed on the uninterruptible power supply, to detect a model type of the uninterruptible power supply, and to detect configuration management information about equipment connected to the uninterruptible power supply;
        a firmware update component associated with the model type of the uninterruptible power supply and the version of the firmware installed on the uninterruptible power supply;

a preparation sequence corresponding to the model type of the uninterruptible power supply and the version of the firmware installed on the uninterruptible power supply, configured to prepare the uninterruptible power supply for the firmware update component; and an instruction component configured to display instructions on the computer system corresponding to the preparation sequence and the firmware update component, wherein the instructions explain to the user how to perform the procedure for updating the firmware and describe effects of the firmware update procedure on the equipment connected to the uninterruptible power supply.

2. The system of claim 1, wherein the communication link is configured to transmit a new version of the firmware and the firmware update component is configured to install the new version of the firmware on the uninterruptible power supply based on the version of the firmware installed on the uninterruptible power supply and the model type of the uninterruptible power supply.

3. The system of claim 2, wherein the firmware update component comprises one or more firmware update files corresponding to one or more model types of uninterruptible power supplies, one or more versions of the firmware update file and one or more firmware update files corresponding to one or more components of the uninterruptible power supply.

4. The system of claim 3, wherein the firmware update component is configured to transmit in response to communication from the uninterruptible power supply only firmware files corresponding to the version of the firmware installed on the uninterruptible power supply, the one or more components of the uninterruptible power supply and the model type of the uninterruptible power supply.

5. The system of claim 1, wherein the instruction component is further configured to display on the computer system a visual representation of components of the uninterruptible power supply and one or more instructional screens configured to explain to the user how to perform the procedure corresponding to updating the firmware.

6. The system of claim 1, wherein the discovery component is further configured to determine versions of the firmware currently installed on components of the uninterruptible power supply, and wherein the instruction component is further configured to display one or more of firmware versions selected to be installed on the uninterruptible power supply.

7. The system of claim 1, wherein the computer system further comprises a plurality of connection ports, and wherein the computer system is configured to automatically determine which of the plurality of connection ports is connected to the uninterruptible power supply.

8. The system of claim 1, wherein the preparation sequence further comprises a communication component configured to control at least one function of the uninterruptible power supply and wherein the instruction component is further configured to obtain permission from the user to control the at least one function of the uninterruptible power supply.

9. The system of claim 1, wherein the preparation sequence further comprises a monitoring component configured to measure system information associated with the uninterruptible power supply and the instruction component is further configured to communicate instructions corresponding to the system information measured by the monitoring component.

10. The system of claim 9, wherein the monitoring component is further configured to determine whether the user performed a step of the displayed instructions and the instruction component is further configured to prevent the user from proceeding in the firmware update procedure if the step of the displayed instructions was not performed.

11. A method of guiding a user through a procedure for updating firmware on an uninterruptible power supply, the method comprising:
establishing a connection between the uninterruptible power supply and a computer system;
detecting a model of the uninterruptible power supply connected to the computer system;
determining a version of the firmware installed on the uninterruptible power supply;
initiating a preparation procedure corresponding to the model of the uninterruptible power supply and the version of the firmware currently installed on the uninterruptible power supply comprising:
determining whether equipment is connected to the uninterruptible power supply;
determining effects of the firmware update procedure on the equipment connected to the uninterruptible power supply; and
alerting the user to the effects of the firmware update procedure on the connected equipment;
initiating a firmware update procedure corresponding to the model of the uninterruptible power supply and the version of the firmware currently installed on the uninterruptible power supply; and
displaying instructions on the computer system corresponding to the preparation procedure and the firmware update procedure to explain to the user how to perform the procedure corresponding to updating the firmware.

12. The method of claim 11, wherein initiating a preparation procedure further comprises transmitting a new version of the firmware to the uninterruptible power supply from the computer system and installing the new version of the firmware on the uninterruptible power supply corresponding to the version of the firmware installed on the uninterruptible power supply and the model type of the uninterruptible power supply.

13. The method of claim 11, wherein initiating a preparation procedure further comprises controlling at least one function of the uninterruptible power supply, and displaying instructions further comprises obtaining permission from the user to control the at least one function of the uninterruptible power supply.

14. The method of claim 11, wherein displaying instructions further comprises displaying one or more instructional screens corresponding to updating the firmware, and wherein the one or more instructional screens further comprise a visual representation of components of the uninterruptible power supply.

15. The method of claim 11, wherein initiating a firmware update procedure further comprises updating a boot load firmware.

16. The method of claim 11, wherein the method further comprises:
detecting an error during the firmware update procedure;
displaying an error screen in response to detecting an error; and
reverting to a previous version of the firmware in response to detecting an error.

17. The method of claim 12, wherein the method further comprises:
measuring system information associated with the uninterruptible power supply;
communicating instructions based on the system information measured;

determining whether the user performed the instructions; and preventing the user from proceeding in the firmware update procedure if the instructions were not performed.

18. A non-transitory computer readable medium having stored thereon sequences of instructions for updating firmware on an uninterruptible power supply including instructions that will cause a processor to:

establish a connection between the uninterruptible power supply and a computer system;

detect a model of the uninterruptible power supply connected to the computer system;

determine a version of the firmware installed on the uninterruptible power supply;

initiate a preparation procedure corresponding to the model of the uninterruptible power supply and the version of the firmware currently installed on the uninterruptible power supply comprising:

determine whether equipment is connected to the uninterruptible power supply;

determine effects of the firmware update procedure on the equipment connected to the uninterruptible power supply; and alert the user to the effects of the firmware update procedure on the connected equipment;

initiate a firmware update procedure corresponding to the model of the uninterruptible power supply and the version of the firmware currently installed on the uninterruptible power supply; and display instructions on the computer system corresponding to the firmware update component to explain to the user how to perform the procedure corresponding to updating the firmware.

* * * * *

UNITED STATES PATENT AND TRADEMARK OFFICE
CERTIFICATE OF CORRECTION

PATENT NO. : 8,713,559 B2
APPLICATION NO. : 12/946400
DATED : April 29, 2014
INVENTOR(S) : Raymond M. Fallon et al.

It is certified that error appears in the above-identified patent and that said Letters Patent is hereby corrected as shown below:

In the Specification:

At column 10, line number 52, insert --X-- between "System" and "available".

Signed and Sealed this
Sixteenth Day of December, 2014

Michelle K. Lee
*Deputy Director of the United States Patent and Trademark Office*